United States Patent
Subramaniam

(10) Patent No.: US 10,638,310 B2
(45) Date of Patent: Apr. 28, 2020

(54) NUMBER OR SUBSCRIBER PORTING

(71) Applicant: HEWLETT PACKARD ENTERPRISE DEVELOPMENT LP, Houston, TX (US)

(72) Inventor: Senthil Kumar Subramaniam, Chennai (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 89 days.

(21) Appl. No.: 15/902,291

(22) Filed: Feb. 22, 2018

(65) Prior Publication Data

US 2019/0261165 A1    Aug. 22, 2019

(51) Int. Cl.

| H04W 8/28 | (2009.01) |
| H04M 3/42 | (2006.01) |
| H04W 8/20 | (2009.01) |
| H04L 9/06 | (2006.01) |
| H04L 9/32 | (2006.01) |

(52) U.S. Cl.
CPC ............ *H04W 8/28* (2013.01); *H04L 9/0618* (2013.01); *H04L 9/3239* (2013.01); *H04M 3/42297* (2013.01); *H04W 8/20* (2013.01); *H04L 2209/38* (2013.01)

(58) Field of Classification Search
CPC ........................ H04L 9/3239; H04L 2209/38
See application file for complete search history.

(56) References Cited

U.S. PATENT DOCUMENTS

| 2007/0263565 A1 | 11/2007 | Roy | |
| 2018/0227429 A1* | 8/2018 | McGarry | H04M 7/0075 |
| 2018/0262615 A1* | 9/2018 | McGarry | H04M 3/42297 |
| 2018/0295546 A1* | 10/2018 | Crawford | H04L 67/104 |
| 2019/0042620 A1* | 2/2019 | Garagiola | H04L 9/0637 |
| 2019/0207762 A1* | 7/2019 | Xie | H04L 63/0823 |
| 2019/0268466 A1* | 8/2019 | Inoue | H04M 3/42297 |

OTHER PUBLICATIONS

Chethan S I, "Blockchain: the Technology That Powers Bitcoin Can Revolutionize Telecom," Aug. 15, 2016, pp. 1-6 [online], Telecom Talk, Retrieved from the Internet on Nov. 29, 2017 at URL: <telecomtalk.info/blockchain-technology-telecom/156106/>.

Faizann, "Blockchain in the Telecommunication Industry," Aug. 24, 2017, pp. 1-6 [online], Retrieved from the Internet on Nov. 29, 2017 at URL: <blog.messagebird.com/blockchain-in-the-telecommunication-industry-acb32326452>.

(Continued)

*Primary Examiner* — Harry S Hong
(74) *Attorney, Agent, or Firm* — Haseltine Lake LLP

(57) ABSTRACT

A method is disclosed for recording a port of a telephone number from a first network operator to a second network operator, the method comprising receiving details of the port of the telephone number from the first network operator to the second network operator, including data identifying the port of the telephone number in a record data block, wherein the record data block includes a representation of contents of a previous record data block, and distributing the record data block to the first network operator and/or the second network operator.

15 Claims, 3 Drawing Sheets

200

(56) References Cited

OTHER PUBLICATIONS

James Savelli-Holt, "Biockchain Opportunities for Telecoms Businesses," Sep. 26, 2017, pp. 1-4 [online], Retrieved from the Internet on Nov. 29, 2017 at URL: <cerillion.com/Blog/Septernber-2017/Blockchain-Opportunities-for-Telecoms-Businesses>.

Preeti Mahawar, "Blockchain and Telecom industry," May 29, 2017, pp. 1-5 [online], Retrieved from the Internet on Nov. 29, 2017 at URL: <mphasis.com/home/thought-leadership/blog/blockchain-and-telecom-industry.html>.

\* cited by examiner

NUMBER OR SUBSCRIBER PORTING

BACKGROUND

Number Portability Clearing Houses (NPCH) manage the portability process and database in a country for allowing a subscriber of a communications service to port a telephone number from one network provider to another. Therefore, a subscriber can change the network provider that provides the subscriber with services, while keeping the same telephone number. A NPCH may be a commercial entity.

Communication Service Providers (CSPs), such as network providers or operators, and the country's government may therefore need to pay for a license as well as operational costs to the NPCH provider to use its number porting services. The primary reason for this model is the trust factor and integrity of the centralized ported number database provided by the third-party NPCH.

BRIEF DESCRIPTION OF DRAWINGS

Examples will now be described, by way of non-limiting example, with reference to the accompanying drawings, in which.

DETAILED DESCRIPTION

Using a centralized Number Portability Clearing Houses (NPCH) or another third-party ported number database provider may be expensive for a Communication Service Provider (CSP) to use. Examples disclosed herein propose a decentralized system for storing information such as ported numbers.

Figure 1:
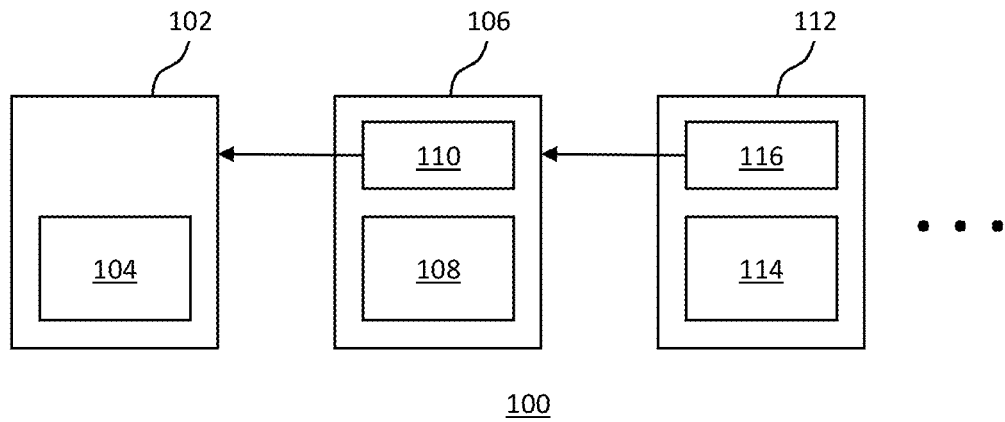
FIG. 1 is a simplified schematic of an example of a blockchain.

In some examples, a decentralized system for storing number or subscriber port information is based on blockchain. FIG. 1 shows a simplified schematic of an example of a blockchain 100. The blockchain 100 includes a first or genesis block 102 that stores some information 104. Each subsequent block in the blockchain 100 stores additional information and a hash value of the previous block. For example, a second block 106 includes information 108 and a hash value 110 of the first block. A third block 112 includes information 114 and a hash value 116 of the second block 106. As a hash value forms part of a block, this becomes incorporated into the hash value of the subsequent block. Therefore, any change to information or a hash value in any block will cause the hash value of the subsequent block to be incorrect, revealing that there has been a change. In some examples, each block may also include a hash of itself (e.g. the information in the block, and in some examples also the hash of the previous block).

A blockchain may contain any number of blocks. A new block to be added to the blockchain may be created periodically, when there is enough information to create a fixed size block, or at any other suitable point.

Figure 2:
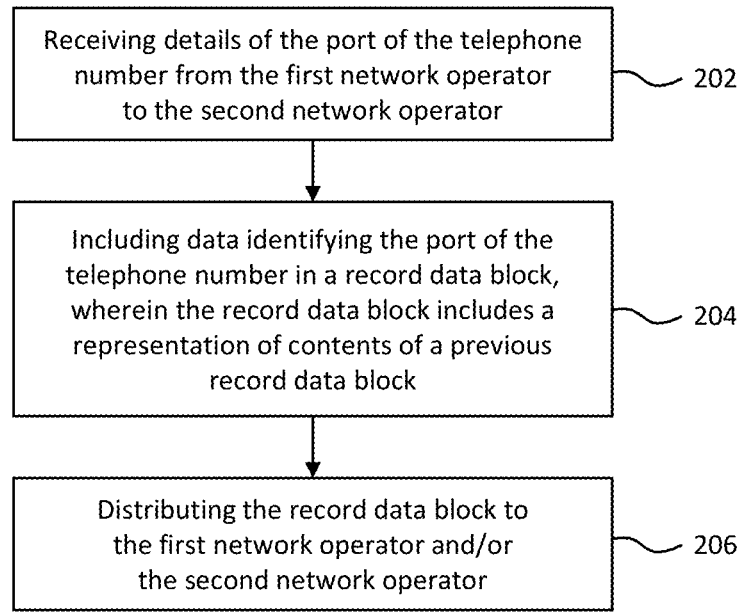
FIG. 2 is a flow chart of an example of a method for recording a port of a telephone number.

FIG. 2 is a flow chart of an example of a method 200, for example a method for recording a port of a telephone number from a first network operator to a second network operator. Each of the first and second network operators may be, for example, a Communications Service Provider (CSP). The method 200 comprises, in block 202, receiving details of the port of the telephone number from the first network operator to the second network operator. The details of the port of the telephone number may be sent in some examples in response to a request for a port of the telephone number generated by a subscriber (e.g. user) of that telephone number. The request may be sent, depending on implementation of the number porting system, to the first network operator (which may in some examples be referred to as the donor CSP) or the second network operator (which may in some examples be referred to as the recipient CSP). The network operator or CSP that receives the request may distribute (e.g. broadcast) the details of the port to other network operators or CSPs.

The details of the port may include, for example, details identifying the first network operator, the second network operator, telephone number and/or subscriber. The telephone number or subscriber may be identified by, for example, Mobile Station International Subscriber Directory Number (MSISDN), International Mobile Subscriber Identity (IMSI), Mobile Subscription Identification Number (MSIN) and/or any other identifying details. In some examples, the telephone number may be a mobile number, in which case the first and/or second network operators may be mobile or wireless network operators. The first and/or second network operators may be operators of fixed networks (e.g. landline networks) in some examples.

Block 204 of the method 200 comprises including data identifying the port of the telephone number in a record data block, wherein the record data block includes a representation of contents of a previous record data block. In some examples, the representation of contents of a previous record data block is a hash or other digest value of the previous data block. In some examples, the record data block and the previous record data block are blocks in a blockchain.

Block 206 of the method 200 comprises distributing the record data block to the first network operator and/or the second network operator. For example, the record data block, when completed (e.g. when it has reached a certain size, or if a predetermined time has passed from creation of the record data block), is broadcast to other network operators or CSPs.

In some examples, the method 200 may be performed by the first network operator or the second network operator. In this case, in step 200, the record data block is distributed to the other provider. In step 202, the details of the port of the telephone number may be received from the other provider, or from a third provider (e.g. where the third provider broadcasts details of the port to other providers). In some examples, the provider implementing the method 200 (e.g. creating and distributing record data blocks) is considered as the party responsible for creating and distributing the blocks. Responsibility may be shared amongst the providers. For example, the provider responsible for creating and distributing record data blocks (e.g. when complete) may change periodically, for example every predetermined period of time or after a predetermined number of completed blocks have been created and distributed.

In some examples, therefore, records of ported telephone numbers or changes in home network of a telephone number or mobile subscriber may be stored in a decentralized fashion. That is, each party (e.g. CSPs) may store a local copy of the records. Trust in the integrity of each party's local copy of the records, for example, may be verified by comparing the records to information in the data blocks (e.g. blockchain). Conversely, trust in the integrity of a block broadcast by another party may be verified by the comparison.

Figure 3:
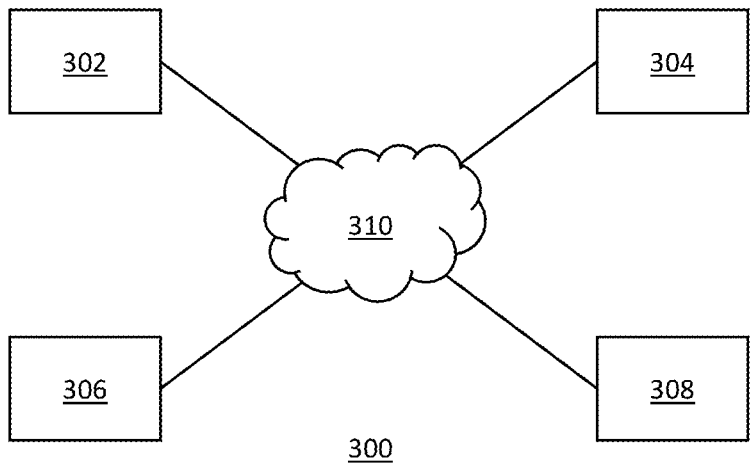
FIG. 3 is a simplified schematic of an example of a number porting system.

FIG. 3 is a simplified schematic of an example of a number porting system 300. The system 300 includes a first CSP 302 (e.g. mobile network, wireless network, mobile network provider, fixed network, fixed network provider), second CSP 304, third CSP 306 and fourth CSP 308. A telephone number may be associated with a CSP. For example, a telephone number may be associated with the first CSP 302, such that the CSP (or its associated network) is considered as the "home" network for the telephone number or the subscriber. As such, phone calls, SMS messages and/or any other communications for the telephone number subscriber are routed to the first CSP 302 such that the first CSP 302 can direct the communications to the subscriber (e.g. onto the subscriber's communications device).

Figure 4:
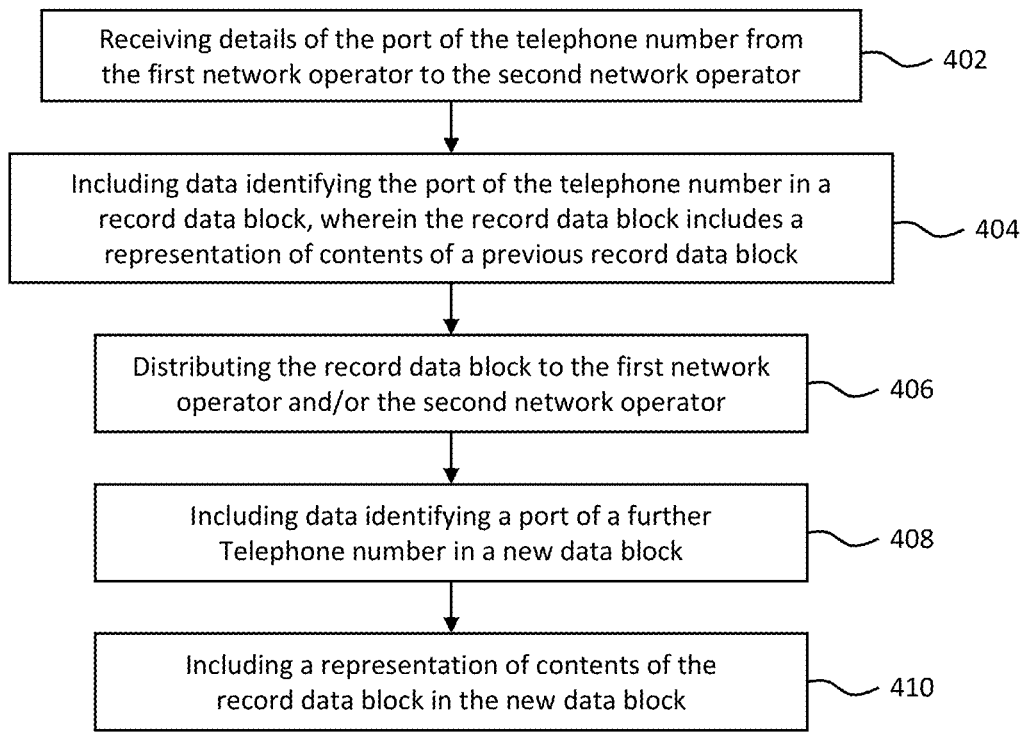
FIG. 4 is a flow chart of an example of a method for recording a port of a telephone number.

FIG. 4 is a flow chart of an example of a method 400 for recording a port of a telephone number from a first network operator to a second network operator. The method comprises, in block 402, receiving details of the port of the telephone number from the first network operator to the second network operator, and in block 404, including data identifying the port of the telephone number in a record data block, wherein the record data block includes a representation of contents of a previous record data block. The method 400 also comprises, in block 406, distributing the record data block to the first network operator and/or the second network operator.

The method 400 also includes, in block 408, including data identifying a port of a further telephone number in a new data block. Thus a new data block, such as for example a new block in a blockchain, can be created. The method 400 includes, in block 410, including a representation of contents of the record data block in the new data block. Thus a chain of blocks can be created. The record data block or the new data block can also in some examples include a hash of the contents of the record data block.

In some examples, in block 406 of the method 400, distributing the record data block to the first network operator and/or the second network operator comprises, if performed during a first period of time, distributing, by the first network operator, the record data block to the second network operator, and if performed during a second period of time, distributing, by the second network operator, the record data block to the first network operator. Each of the first and second network operators therefore have the responsibility for creating and distributing data blocks at different times. In some examples, one or more further network operators may also have this responsibility during one or more further periods of time. The responsibility may be passed between the network operators in a round-robin fashion, and the responsible party may change for example after a fixed period of time, after a predetermined number of blocks have been created and distributed by the responsible party, after a block has reached a predetermined size, or according to any other suitable condition.

In some examples, the method 400 is implemented by the first network operator. In this case, and distributing the record data block to the first network operator and/or the second network operator comprises distributing the record data block to the second network operator. Alternatively, for example, or at a different time, the method 400 is implemented by the second network operator. As such, distributing the record data block to the first network operator and/or the second network operator comprises distributing the record data block to the first network operator.

In some examples, the number porting process from a first network operator to a second network operator includes the first and second operator sending a number of transactions to each other. These may include a request for the port of the telephone number sent by the second network operator to the first network operator; an acknowledgement of the port of the telephone number sent by the first network operator to the second network operator; a notification of activation of the telephone number by the second network operator sent by the second network operator to the first network operator; and a notification of the port of the telephone number sent by the first network operator to the second network operator and a third network operator. Each of these transactions may identify one or more of the telephone number being ported, the first network operator (e.g. the donor CSP), and/or the second network operator (e.g. the recipient CSP). One or more of these transactions may also be broadcast (e.g. via the network 310 shown in FIG. 3) to other CSPs, if present. In some examples, where the responsibility for creating and distributing data blocks changes between the CSPs, the CSP currently responsible may include details of one or more of these broadcast transactions in the record data block. Where the CSP responsible is also the donor or recipient CSP, for example, details of one or more of the transactions may be included in the data block without being received from another CSP. Thus, in some examples, in block 404 of the method 400 includes data identifying the port of the telephone number in the record data block comprises including, in the record data block, details identifying at least one of the above-identified transactions.

A block in the blockchain may store details of transactions in any suitable manner. In some examples, the details may also be verifiable by another process. For example, the details may be accompanied by a digital signature applied by a party that generated the transaction.

Figure 5:
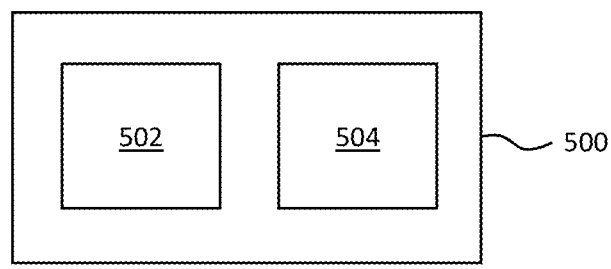
FIG. 5 is a simplified schematic of an example of apparatus for recording changes of a home wireless network of a mobile subscriber.

FIG. 5 is a simplified schematic of an example of apparatus 500 for recording changes of a home network of a communications service subscriber. The apparatus 500 may in some examples be, or be comprised in, a wireless network, a mobile network, a CSP, or a provider or operator of a wireless network, a mobile network or a CSP. The home network may be for example the network to which communications intended for the subscriber are routed.

The apparatus 500 comprises a recording module 502 to, in response to a request to change the home network of the subscriber from a first network to a second network, record details identifying the change to a current block in a blockchain. The request may in some examples be received from the subscriber or from a donor or recipient network. The apparatus 500 may in some examples be or be implemented in the donor or recipient network.

The apparatus 500 also includes a distribution module 504 to distribute the current block to the first network and/or the second network upon completion of the current block. For example, where the apparatus 500 comprises or is included in one of the first and second networks, the completed current block is distributed to the other networks, and in some examples also to other networks (e.g. one or more other CSPs). In some examples, the apparatus 500 may at a later or earlier time receive a different block in the blockchain from another network, such as for example from one of the first and second networks or another network, provider, operator or CSP. In some examples, each of the first and second networks may be a fixed network or a mobile or wireless network.

Figure 6:
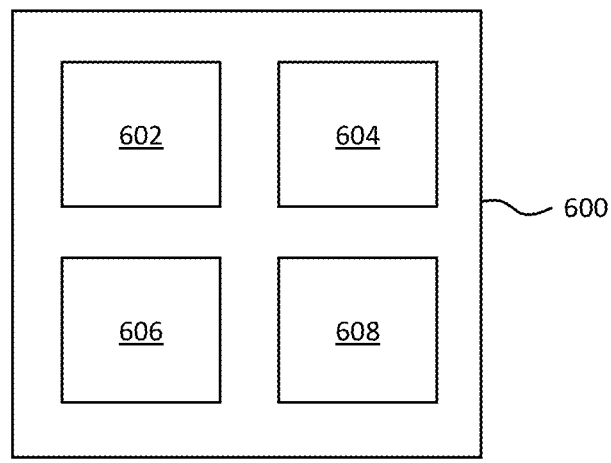
FIG. 6 is a simplified schematic of an example of apparatus for recording changes of a home wireless network of a mobile subscriber.

FIG. 6 is a simplified schematic of an example of apparatus 600 for recording changes of a home network of a communications service subscriber. The apparatus 600 may in some examples be, or be comprised in, a wireless network, a fixed network, a mobile network, a CSP, or a provider or operator of a network (fixed or wireless) or a CSP. The home network may be for example the network to which communications intended for the subscriber are routed. For example, communications may identify the subscriber using any suitable method, such as for example the subscriber's telephone number.

The apparatus 600 includes a recording module 602 and a distribution module 604, which may in some examples be similar to the recording module 502 and distribution module 504 shown in FIG. 5. The apparatus 600 also comprises a routing module 606 to receive an incoming communication for the subscriber or another subscriber, to determine the home network of the subscriber or the another subscriber from the blockchain, and to route the communication to the home network of the subscriber or the another subscriber. For example, when the apparatus 600 receives a communication for a subscriber, the routing module 606 checks the contents of the blocks in the blockchain (stored in some examples in storage local to or accessible by the apparatus 600) to determine whether the subscriber has been ported between wireless networks. If so, the record is located in the details from the contents of the blockchain, and the communication is routed to the appropriate home network of the subscriber. If no record exists, then in some examples the apparatus 600 determines that the subscriber has never been ported between networks, and the communication can be routed appropriately. For example, the communication can be routed based on number range. In this case, for example, a block of telephone numbers is assigned to a network (e.g. CSP) by a regulatory body. All networks may add this block of numbers to a local database, and identify in the database the network to which the numbers are assigned, i.e. the home network for those numbers.

The apparatus 600 also includes a validation module 608 to receive a further block in the blockchain from a provider of the first network or a provider of the second network, and to validate details of changes of home network of subscribers in the further block. This may occur for example if the responsibility for creating blocks in the blockchain changes between parties (e.g. providers, operators, networks or CSPs), for example periodically. The validation module may validate the further block by, for example, comparing details of ports with records. In an example, each transaction in a number or subscriber porting process or a change in a subscriber's home network is broadcast to all CSPs, and each CSP stores the transaction. Details of the transactions are also added to the latest block in the blockchain by the responsible CSP. When the block is completed and broadcast to the other CSPs, the validation module 608 may compare details of the transactions in the block to the previously received transactions, to determine whether they match. The validation module 608 may also compare a hash value (or other digest) stored in the recently received block and check that it matches the hash of the previous block in the blockchain. If the hash or other digest does not match, or there is a mismatch in transactions identified in the block and previously received, then the apparatus 608 may, for example, ignore the transactions identified in the block or the mismatched transactions. As a result, the apparatus 600 may assume that the corresponding change to subscriber home network has not taken place, and the routing module 606 may then perform the appropriate routing of communications.

Figure 7:
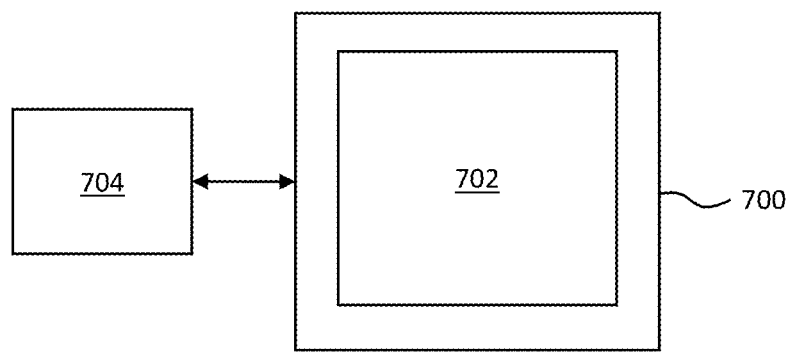
FIG. 7 is a simplified schematic of an example of a machine-readable medium.

FIG. 7 is a simplified schematic of an example of a machine-readable medium 700 comprising instructions 702 that, when executed by a processor 704, cause the processor 704 to receive communications service subscriber routing information, wherein the communications service subscriber routing information identifies a network to which communications to a communications service subscriber should be routed, include information identifying the communications service subscriber and the network in a latest data block that includes a digest of an earlier data block, and broadcast the latest data block to a network operator. The latest data block may be, for example, the latest or current data block in a blockchain.

In some examples the instructions 702 include instructions that, when executed by the processor 704, cause the processor 704 to broadcast the latest data block to a network operator during a first time period, and to receive a further data block from the network operator during the second time period, wherein the further data block includes a digest of the latest data block or another data block in a chain of data blocks that includes the latest data block, the another data block and the further data block. Thus, for example, the responsibility for creating data blocks in a blockchain may pass between network operators periodically, for example after a certain period of time, number of transactions or size of data block.

In some examples, the instructions 702 include instructions that, when executed by the processor 704, cause the processor 704 to receive an incoming transmission for the communications service subscriber, to determine, from the further data block or the another data block, the network to which communications to the communications service subscriber should be routed, and to route the transmission to the network. Thus communications can be routed appropriately to the communications service subscriber (e.g. to the communications service subscriber's home network) based on the communications service subscriber routing information.

In some examples, the instructions 702 include instructions that, when executed by the processor 704, cause the processor 704 to receive further communications service subscriber routing information that identifies a further network to which communications to a further communications service subscriber should be routed, and to validate the further data block or the another data block by comparing the further communications service subscriber routing information to information in the further data block or the another data block that identifies the further network to which communications to the further communications service subscriber should be routed. Thus for example the validity of the further communications service subscriber routing information can be verified by checking that there is a match in the further data block or the another data block. If not, the further communications service subscriber routing information can, for example, be ignored.

In some examples, the instructions 702 include instructions that, when executed by the processor 704, cause the processor 704 to broadcast the latest data block to one or more further network operators.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for managing a portability process of a telephone number from a first network operator to a second network operator, the method comprising:
   receiving, as part of the portability process of the telephone number, a request to port the telephone number from the first network operator to the second network operator, wherein the request comprises data to initiate the portability process of the telephone number, and wherein the data comprises the telephone number, the first network operator, and the second network operator;
   identifying a blockchain data structure for storing telephone numbers and corresponding network operators of the telephone numbers, wherein the blockchain data structure comprises at least a first record data block that comprises a first portion of the data to identify the telephone number and the first network operator, and a second record data block that comprises a second portion of the data to identify the telephone number and the first network operator, and
      wherein the first record data block is stored with the first network operator and the second record data block is stored with the second network operator;
   generating an updated first portion of the data to identify the telephone number and the second network operator, and an updated second record data block that comprises a second portion of the data to identify the telephone number and the second network operator,
      wherein generating the updated first portion of the data and the updated second portion of the data comprises initiating a hashing process of the first portion of the data to identify the telephone number and the first network operator and the second portion of the data to identify the telephone number and the first network operator, respectively;
   transmitting the updated first portion of the data to the first network operator, wherein the first network operator is enabled to update the first record data block; and
   transmitting the updated second portion of the data to the second network operator, wherein the second network operator is enabled to update the second record data block.

2. The method of claim 1, wherein transmitting the first record data block to the first network operator comprises:
   if performed during a first period of time, transmitting, by the first network operator, the first record data block to the second network operator;
   if performed during a second period of time, transmitting, by the second network operator, the first record data block to the first network operator.

3. The method of claim 2, wherein transmitting the first record data block to the first network operator comprises, if performed during a third period of time, transmitting, by a third network operator, the first record data block to the first network operator and the second network operator.

4. The method of claim 1, wherein the method is implemented by the first network operator, and transmitting the record data block to the first network operator comprises transmitting the first record data block to the second network operator.

5. The method of claim 1, wherein the method is implemented by the second network operator, and transmitting the record data block to the first network operator comprises transmitting the second record data block to the first network operator.

6. The method of claim 1, wherein the request to port the telephone number is sent by the second network operator to the first network operator.

7. The method of claim 1, wherein the data also comprises a Mobile Station International Subscriber Directory Number (MSISDN), an International Mobile Subscriber Identity (IMSI), or a Mobile Subscription Identification Number (MSIN).

8. The method of claim 1, further comprising receiving an acknowledgement of the request to port the telephone number.

9. The method of claim 1, wherein initiation of the portability process is performed by the first network operator during a first time and performed by the second network operator during a second time, and wherein the first time and the second time occur in a round-robin fashion.

10. The method of claim 1, further comprising:
determining a size of the first record data block;
comparing the size of the first record data block with a predetermined size; and
when the size of the first record data block is less than the predetermined size, changing responsibility for initiating the portability process to a different network operator.

11. The method of claim 1, wherein the first record data block is stored at a storage local to the first network operator.

12. An apparatus for managing a portability process of a telephone number from a first network operator to a second network operator, the apparatus configured to:
receive, as part of the portability process of the telephone number, a request to port the telephone number from the first network operator to the second network operator, wherein the request comprises data to initiate the portability process of the telephone number, and wherein the data comprises the telephone number, the first network operator, and the second network operator;
identify a blockchain data structure for storing telephone numbers and corresponding network operators of the telephone numbers, wherein the blockchain data structure comprises at least a first record data block that comprises a first portion of the data to identify the telephone number and the first network operator, and a second record data block that comprises a second portion of the data to identify the telephone number and the first network operator, and
wherein the first record data block is stored with the first network operator and the second record data block is stored with the second network operator;
generate an updated first portion of the data to identify the telephone number and the second network operator, and an updated second record data block that comprises a second portion of the data to identify the telephone number and the second network operator,
wherein generating the updated first portion of the data and the updated second portion of the data comprises initiating a hashing process of the first portion of the data to identify the telephone number and the first network operator and the second portion of the data to identify the telephone number and the first network operator, respectively;
transmit the updated first portion of the data to the first network operator, wherein the first network operator is enabled to update the first record data block; and
transmit the updated second portion of the data to the second network operator, wherein the second network operator is enabled to update the second record data block.

13. The apparatus of claim 12, wherein initiation of the portability process is performed by the first network operator during a first time and performed by the second network operator during a second time, and wherein the first time and the second time occur in a round-robin fashion.

14. The apparatus of claim 12, the apparatus further configured to:
determine a size of the first record data block;
compare the size of the first record data block with a predetermined size; and
when the size of the first record data block is less than the predetermined size, change responsibility for initiating the portability process to a different network operator.

15. A non-transitory machine-readable medium comprising instructions that, when executed by a processor, cause the processor to:
receive, as part of the portability process of the telephone number, a request to port the telephone number from the first network operator to the second network operator, wherein the request comprises data to initiate the portability process of the telephone number, and wherein the data comprises the telephone number, the first network operator, and the second network operator;
identify a blockchain data structure for storing telephone numbers and corresponding network operators of the telephone numbers, wherein the blockchain data structure comprises at least a first record data block that comprises a first portion of the data to identify the telephone number and the first network operator, and a second record data block that comprises a second portion of the data to identify the telephone number and the first network operator, and
wherein the first record data block is stored with the first network operator and the second record data block is stored with the second network operator;
generate an updated first portion of the data to identify the telephone number and the second network operator, and an updated second record data block that comprises a second portion of the data to identify the telephone number and the second network operator,
wherein generating the updated first portion of the data and the updated second portion of the data comprises initiating a hashing process of the first portion of the data to identify the telephone number and the first network operator and the second portion of the data to identify the telephone number and the first network operator, respectively;
transmit the updated first portion of the data to the first network operator, wherein the first network operator is enabled to update the first record data block; and
transmit the updated second portion of the data to the second network operator, wherein the second network operator is enabled to update the second record data block.

* * * * *